US009405528B2

(12) United States Patent
Osterloh et al.

(10) Patent No.: US 9,405,528 B2
(45) Date of Patent: Aug. 2, 2016

(54) EFFICIENT FIRMWARE UPDATE IN A NARROW BANDWIDTH SYSTEM

(71) Applicant: Itron, Inc., Liberty Lake, WA (US)

(72) Inventors: Christopher Lloyd Osterloh, Waseca, MN (US); James Patrick Ogle, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 14/398,940

(22) PCT Filed: Mar. 15, 2013

(86) PCT No.: PCT/US2013/032301
§ 371 (c)(1),
(2) Date: Nov. 4, 2014

(87) PCT Pub. No.: WO2013/165609
PCT Pub. Date: Nov. 7, 2013

(65) Prior Publication Data
US 2015/0121359 A1    Apr. 30, 2015

(30) Foreign Application Priority Data
May 4, 2012    (EP) .................................... 12166876

(51) Int. Cl.
G06F 9/45        (2006.01)
G06F 9/445       (2006.01)
H04L 29/08       (2006.01)

(52) U.S. Cl.
CPC    *G06F 8/65* (2013.01); *G06F 8/665* (2013.01); *H04L 67/10* (2013.01); *H04L 67/12* (2013.01); *H04L 67/34* (2013.01)

(58) Field of Classification Search
CPC ............ H04L 67/34; H04L 67/12; G06F 8/65
USPC .......................................................... 717/172
See application file for complete search history.

(56) References Cited

U.S. PATENT DOCUMENTS 6,380,851 B1    4/2002    Gilbert et al.
6,538,577 B1    3/2003    Ehrke et al.
(Continued)

FOREIGN PATENT DOCUMENTS

EP        1649612        6/2010
WO     WO2008086231     7/2008
(Continued)

OTHER PUBLICATIONS

The European Office Action mailed Nov. 7, 2014 for European patent application No. 12169873.2, a counterpart foreign application of U.S. Pat. No. 8,767,744, 4 pages.
(Continued)

*Primary Examiner* — John Chavis
(74) *Attorney, Agent, or Firm* — Lee & Hayes, PLLC

(57) ABSTRACT

An advanced metering infrastructure may be configured for automated meter reading, such as of utility (electric, natural gas, etc.) meters. Within a network, a data collector communicates with, and receives meter data from, a plurality of endpoints. Firmware on the endpoints may be updated by transmission, from the data collector, of a new firmware image. In one example, the data collector sends an announcement of a firmware update to the plurality of endpoints. At a time indicated by the announcement, the data collector multicasts the firmware update a plurality of times. The data collector then receives indications from a plurality of endpoints that did not successfully receive all blocks of the multicast firmware update. In response, the data collector sends missing blocks to the plurality of endpoints according to the indications.

19 Claims, 7 Drawing Sheets

(56) References Cited

U.S. PATENT DOCUMENTS

| | | |
|---|---|---|
| 8,024,724 B2 | 9/2011 | Garrison Stuber et al. |
| 8,031,082 B2 | 10/2011 | Cornwall |
| 2005/0160257 A1* | 7/2005 | Kruger .................. G06F 8/64 |
| | | 713/2 |
| 2005/0240540 A1 | 10/2005 | Borleske et al. |
| 2006/0271244 A1* | 11/2006 | Cumming ............. G01D 4/004 |
| | | 700/291 |
| 2008/0259844 A1* | 10/2008 | Richeson ............ H04M 11/002 |
| | | 370/328 |
| 2009/0225670 A1 | 9/2009 | Leung et al. |
| 2011/0074599 A1 | 3/2011 | Cornwall et al. |
| 2011/0096711 A1 | 4/2011 | Liu et al. |
| 2012/0060152 A1 | 3/2012 | Oh et al. |
| 2012/0110379 A1* | 5/2012 | Shao ................... G06F 11/1417 |
| | | 714/15 |
| 2013/0055231 A1* | 2/2013 | Hyndman ................ G06F 8/68 |
| | | 717/169 |
| 2013/0103974 A1* | 4/2013 | Bower, III ............... G06F 8/665 |
| | | 714/3 |
| 2013/0110426 A1* | 5/2013 | Van Olst ............... G06F 1/1626 |
| | | 702/62 |
| 2013/0138635 A1* | 5/2013 | Park .................. G06F 17/30241 |
| | | 707/723 |
| 2013/0145452 A1* | 6/2013 | Ollukaren ........... H04L 63/0272 |
| | | 726/15 |
| 2013/0294237 A1 | 11/2013 | Osterloh et al. |
| 2014/0258544 A1 | 9/2014 | Osterloh et al. |
| 2015/0212122 A1* | 7/2015 | Sobotka ................. G01D 4/002 |
| | | 324/764.01 |

FOREIGN PATENT DOCUMENTS

| | | |
|---|---|---|
| WO | WO2008123995 | 10/2008 |
| WO | WO2011041249 | 4/2011 |
| WO | WO2011094511 | 8/2011 |

OTHER PUBLICATIONS

The Extended European Search Report mailed Oct. 5, 2012 for European patent application No. 12166876.8, 5 pages.

The Extended European Search Report mailed Apr. 22, 2013 for European patent application No. 12169873.2, 6 pages.

Office action for U.S. Appl. No. 13/464,678, mailed on Nov. 14, 2013, Osterloh et al., "Prioritized Reporting of Metering Data", 7 pages.

The PCT Search Report mailed Jun. 11, 2013 for PCT application No. PCT/US13/32301, 9 pages.

The PCT Search Report mailed Jun. 28, 2013 for PCT application No. PCT/US13/32291, 11 pages.

* cited by examiner

EFFICIENT FIRMWARE UPDATE IN A NARROW BANDWIDTH SYSTEM

CROSS REFERENCE TO RELATED APPLICATIONS

This application is a continuation of, and claims foreign priority to PCT Application number PCT/US13/3230, filed Mar. 15, 2013, entitled "Efficient Firmware Update in a Narrow Bandwidth System," and is also a continuation of and claims priority to European Patent Application No. EP 12166876.8, filed May 4, 2012, entitled "Efficient Firmware Update in a Narrow Bandwidth System," all of which are incorporated herein by reference.

BACKGROUND

An electric, water or natural gas utility company may manage hundreds of thousands or millions of metering devices located at customer sites. Such meters measure utility consumption and may be considered endpoints in a network, which may be configured as an advanced metering infrastructure (AMI) for automated meter reading (AMR).

Updating the firmware on hundreds of thousands of endpoints is a daunting task. The volume of network activity caused by the update may result in problems for other network traffic, such as the transmission of metering data. Additionally, nodes having different revision levels of firmware operating at the same time may create compatibility or integration issues. And further, the longer such a process takes, the more battery power is consumed by many of the endpoints, which are not attached to the electric grid. Increased diversity of endpoints has resulted in more frequent firmware updates, and a firmware update for some endpoints may result in firmware changes for other endpoints.

Unfortunately, as advanced metering infrastructures have become more complex, known methods for providing a firmware update have not scaled well. Increasingly large periods of time must be devoted to such updates. Moreover, the updates and the time required to distribute them tend to reduce network bandwidth available for other purposes.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
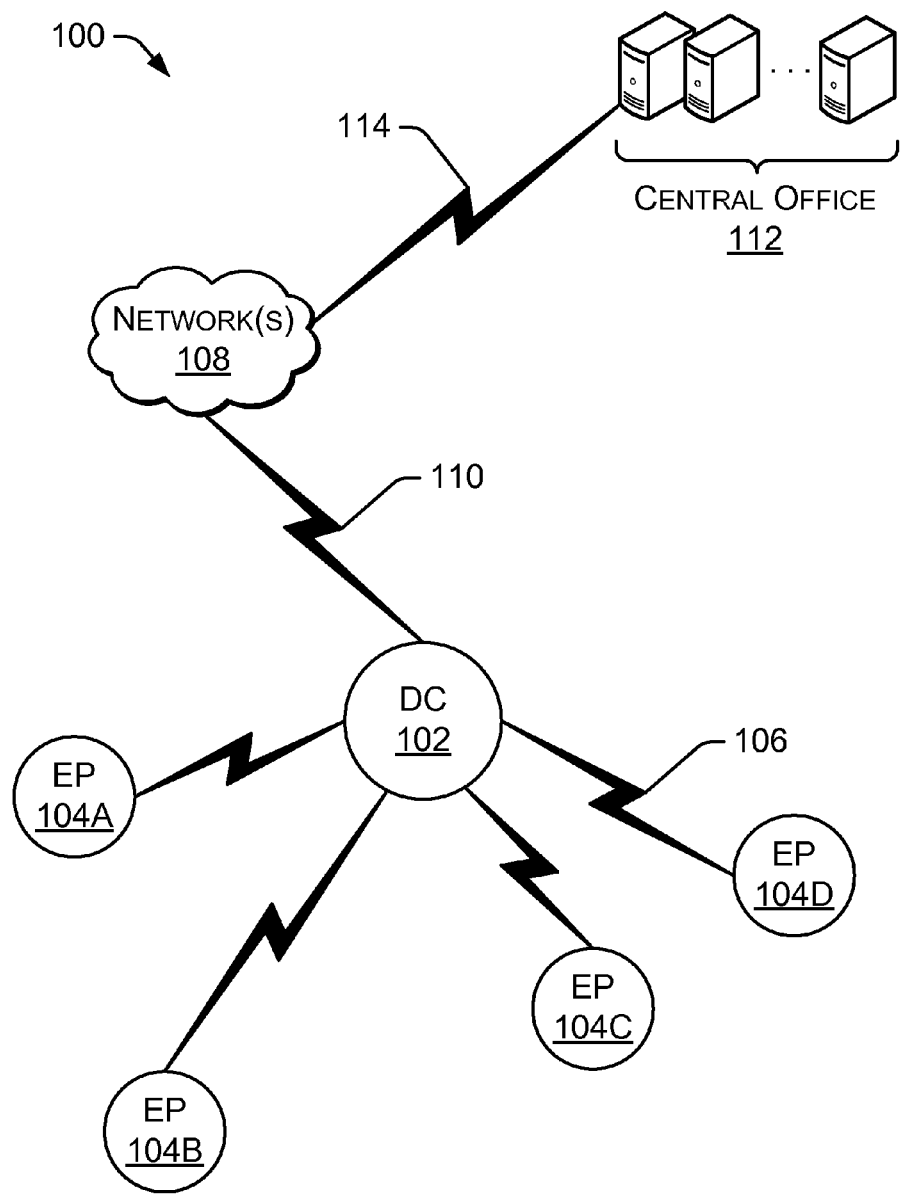
FIG. 1 is a diagram showing an example network configured for efficient firmware update in a narrow bandwidth system.

The disclosure describes techniques for providing efficient firmware update in a narrow bandwidth system. The techniques described herein may be adapted to a variety of network environments, such as advanced metering infrastructure (AMI) networks configured for automated meter reading (AMR). Such networks may include a number of utility meters (e.g., gas, water or electric meters, etc.), and may be organized into a network headed by a "root" or "data collector." The data collector can be any device that has enough processing power and memory resources to communicate with a plurality of endpoints. The data collector has a data collecting function, wherein it collects consumption data from a plurality of endpoints within the ARA. The endpoints may be nodes in the networked environment that are each associated with a meter and are configured to gather and report metering data to the data collector. Each endpoint may be (or be associated with) a "smart meter" configured for network communication of consumption data, such as data associated with the consumption of electricity, natural gas, water, etc. Such endpoints may include a processor and memory, which may execute an operating system, core programming, applications, etc. Accordingly, update of such software, which could be collectively considered "firmware," may be required from time to time.

An example illustrating some of the techniques discussed herein—not to be considered an exhaustive discussion—describes aspects of efficient firmware update in a narrow bandwidth system. In the example, an announcement of a firmware update may be sent by the data collector to a plurality of endpoints. The announcement of the firmware update may be made in a unicast manner, from the data collector to each endpoint individually. The announcement may indicate a time, radio frequency, etc., during which the update will be transmitted.

The firmware update may be multicast and/or broadcast to the endpoint(s) according to the announcement. The multicast may be performed a plurality of times, which increases the likelihood of full and complete reception by each of the endpoint(s). For example, the multicast may be performed five times, which may result in a high percentage of the endpoints receiving a complete firmware image.

However, one or more of the plurality of endpoints may not receive the complete firmware image. Accordingly, each endpoint may be given an opportunity to provide an indication of missing blocks that were not successfully received.

Missing blocks may be sent to the plurality of endpoints that did not successfully receive all blocks of the multicast firmware update. The missing blocks may be sent according to the indications received from each endpoint. In different examples, the missing blocks may be broadcast, multicast or unicast.

The discussion herein includes several sections. Each section is intended to be an example of techniques and/or structures, but is not intended to indicate elements which must be used and/or performed. A section entitled "Example Firmware Update Environment" describes an example networked environment wherein a data collector is in communication with a plurality of endpoints. A section entitled "Example Data Collector" describes an example structure of a data collector, including example software, firmware and/or hardware functional blocks. A section entitled "Example Endpoint" describes an example structure of an endpoint, including example software, firmware and/or hardware functional blocks. A section entitled "Example Methods" discusses aspects of methods by which devices are operated, including processors, memory devices, application specific integrated circuits (ASICs), gate arrays, etc. This brief introduction is provided for the reader's convenience and is not intended to describe and/or limit the scope of the claims or any section of this disclosure.

Example Firmware Update Environment

FIG. 1 is a diagram illustrating an example networked environment or system 100 configured as an advanced metering infrastructure (AMI) for automated meter reading (AMR). The system 100 may have a narrow bandwidth capability (e.g., 4.8 kbps, although this is relative to current technology, and could vary widely), yet may be configured for efficient firmware update. The networked environment may include a "root" or data collector 102 and a plurality of endpoints or nodes 104A-104D (collectively referred to as nodes or endpoints 104). In one example of operation, the data collector 102 may announce and then provide a firmware update to a plurality of endpoints 104. The endpoints may receive some or all of the blocks of the firmware image transmitted, and may report this information. The data collector 102 may provide any missing blocks by means of a subsequent broadcast, multicast and/or unicast.

The data collector 102 may communicate with the endpoints 104 over a common communication channel 106. The common communication channel 106 may utilize a radio frequency (RF) or a wired medium. A wired medium may include dedicated wiring, or may include power line communication (PLC), i.e., a data signal superimposed over an alternating current (AC) power distribution line. The data collector 102 may communicate with a network 108, such as the Internet, by a cellular link 110 or other connection. The network 108 may provide communication with a central office 112 over a back-haul network 114 or other connection.

One characteristic of communication between the data collector 102 and endpoints 104 over the RF channel 106 is the possibility of receipt of a corrupted firmware update by one or more endpoints. For example, one or more blocks of a firmware image may not be correctly received by one or more endpoints. The data collector 102 and endpoints 104 may employ techniques discussed herein to detect this error and provide replacement blocks.

Example Data Collector

Figure 2:
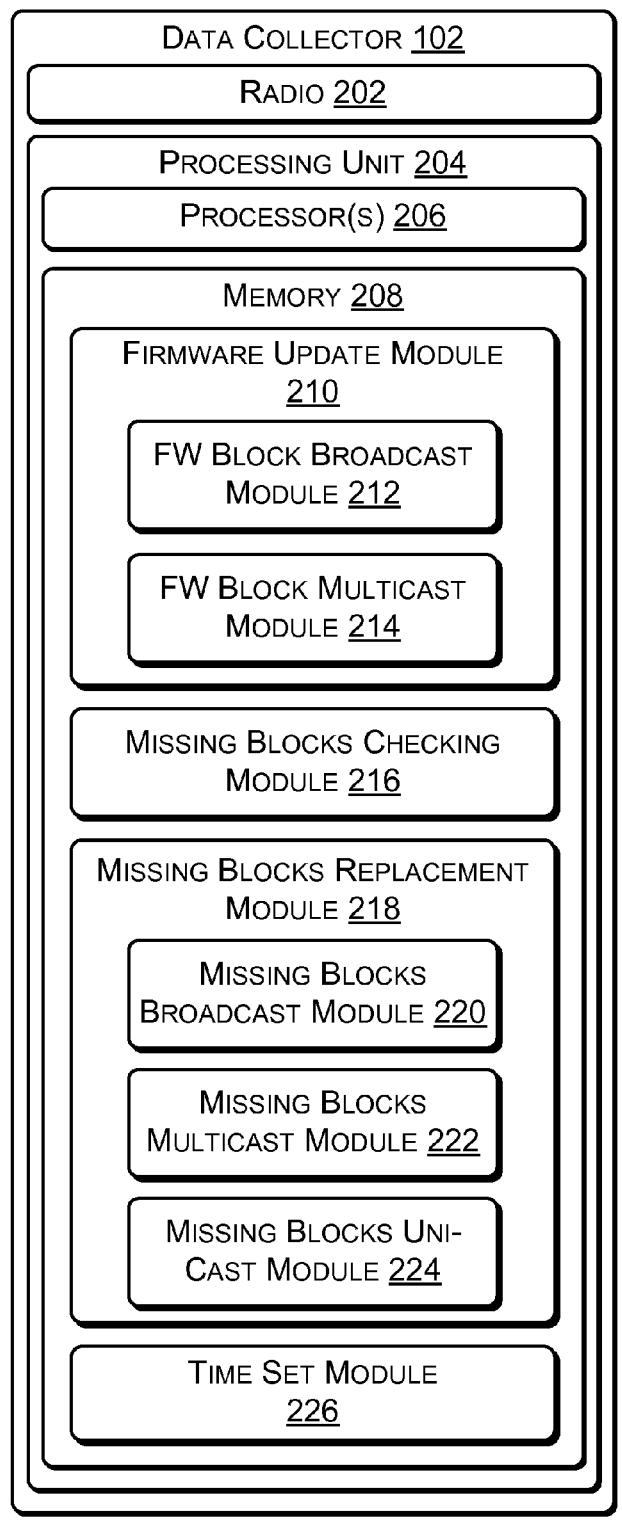
FIG. 2 is a diagram showing example details of a data collector, including a processing unit configured for efficient firmware update in a narrow bandwidth system.

FIG. 2 is a diagram showing example detail of a data collector, such as the data collector 102 in of FIG. 1, configured for efficient firmware update in a narrow bandwidth system. The data collector 102 may include a radio 202 and a processing unit 204. The radio 202 may provide two-way radio frequency (RF) communication between the data collector 102 one or more endpoints (e.g., endpoints 104 in FIG. 2). The processing unit 204 may include a processor 206 and a memory 208. The memory 208 may include processor-readable instructions, which when executed by the processor 206 perform functions that may include some or all of the functions described herein. In a further example, the functionality of the processor 206 and processor-executable instructions defined in the memory 208 may be performed by a hardware device, such as an application specific integrated circuit (ASIC), a gate array or other hardware-based logic device.

In the example data collector 102 of FIG. 2, the memory 208 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.), as understood by those trained in the art.

A firmware update module 210 may be configured to provide a firmware update to one or more endpoints, either sequentially or in parallel. The firmware update may include one or more blocks or segments of data, which collectively comprise a firmware "image" or file.

The firmware update module 210 may be configured to provide an announcement to one or more endpoints of an upcoming firmware update. The announcement may include a starting time and/or time period for the update, a frequency of the transmission, groups of endpoints that must receive the update, and/or other information that may assist the endpoint(s) to receive the update. In one example, the update may be unicast to each endpoint individually. In this example, each endpoint may transmit meter data indicating consumption measured by the meter at the endpoint. During a period of time after this transmission, the endpoint may have a radio receiver turned on and be receptive to commands. This period of time or "window" allows the endpoint to receive commands, while allowing the endpoint to conserve (battery) power at other times by turning its receiver off. Thus, the firmware update module 210 may be configured to provide an announcement of a firmware update during an appropriate window during which the endpoint(s) are configured to receive information and/or commands.

The firmware update module 210 may be configured to provide the firmware image to one or more endpoints. The firmware image may be segmented into one or more "blocks" for transmission. The blocks may be sent using broadcast and/or multicast techniques. In the example of FIG. 2, a firmware block broadcast module 212 and/or a firmware multicast module 214 may be available for use in transmitting the blocks of the firmware image to one or more endpoints.

In some examples, a missing blocks checking module 216 may be configured to check for missing blocks of the firmware image among the endpoint(s) to which it was broadcast and/or multicast. In one example, the missing blocks checking module 216 may be configured to send a command to each endpoint in the window described above following transmission by the endpoint of meter data. The command may ask for the endpoint to disclose any blocks not received and/or that were received but in a corrupted or incomplete state.

A missing blocks replacement module 218 may be configured to provide replacement blocks of the firmware image to endpoints that did not receive an uncorrupted version of the entire image. The missing blocks replacement module 218 may refer to data (e.g., from the missing blocks checking module 216) indicating blocks of a firmware image missed by endpoints in a broadcast area of the data collector. The data may be used to determine which firmware blocks should be sent to which endpoints. The missing blocks may be provided by several different means. In a first example, a missing blocks broadcast module 220 is configured to broadcast blocks of a firmware image to endpoint(s) missing the broadcast blocks. In this example, the missing blocks checking module 216 may have configured a list of endpoint(s) and the firmware block(s) that they are each missing. The endpoints on the list may be contacted, individually or in one or more groups, and provided with an announcement of the broadcast time, frequency and/or other details. The firmware block(s) on the list may then be broadcast to the endpoint(s) in accordance to the announcement. In a further example, the missing blocks replacement module 218 may divide the missing firmware blocks into smaller blocks for transmission. The smaller blocks may involve slightly higher overhead than larger blocks, but may be more readily transmitted without error.

In a second example, a missing blocks multicast module 222 may function similarly to the missing blocks replacement module 218, but provide a multicast transmission of the missing firmware blocks.

In a third example, a missing blocks unicast module 224 may be configured to unicast the missing firmware blocks to each endpoint individually. In this example, the endpoints may be individually contacted, asked what blocks are needed, and provided the needed blocks by a unicast transmission.

A time set module 226 may be configured to provide time information to one or more endpoints. While a firmware update includes far more data than a time update, it may be the case that time synchronization is more frequently provided by the data collector to one or more endpoints. The time set module 226 may provide the time signal and/or data packet by unicast, multicast or broadcast.

Example Endpoint

Figure 3A:
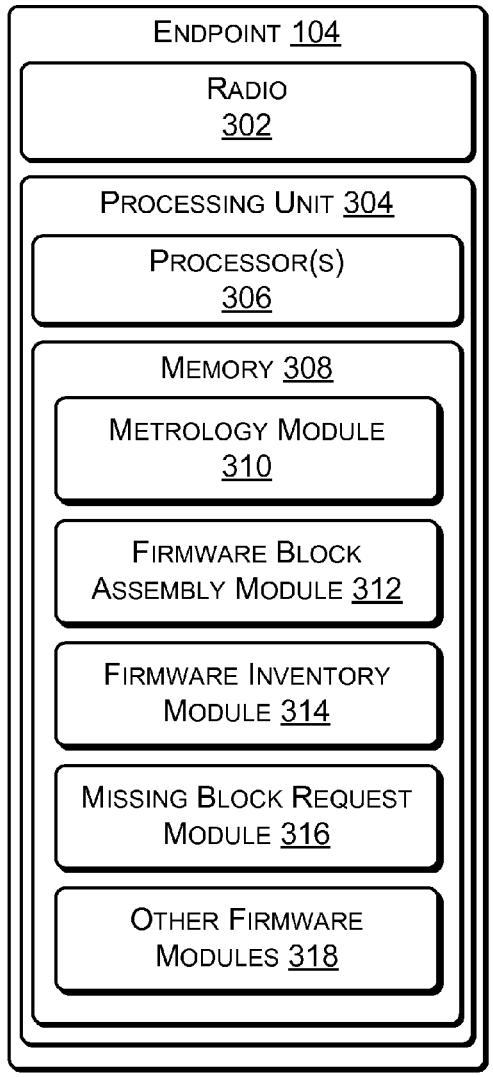
FIG. 3A is a diagram showing example details of an individual node, including a processing unit configured for efficient firmware update in a narrow bandwidth system.

FIG. 3A is a diagram showing example details of an individual node or endpoint 104. The endpoint 104 may be configured for interaction with the example data collector of FIG. 2, and for efficient firmware update in a narrow bandwidth system.

In one example, the endpoint 104 may include a radio 302 and a processing unit 304. The radio 302 may provide two-way RF communication with the data collector 102 and/or other endpoints. The processing unit 304 may include a processor 306 and a memory 308 and/or other hardware device (s), such as an application specific integrated circuit (ASIC), a gate array or other hardware-based logic device.

In a manner similar to that seen in FIG. 2, the endpoint 104 of FIG. 3A may include software functionality configured as one or more "modules" within the memory 308. Accordingly, while various "modules" are discussed, their functionality and/or similar functionality could be arranged differently, as understood by those trained in the art.

A metrology module 310 may be configured to receive consumption data that is obtained from a meter (which may be integral to or associated with the endpoint). The metrology module 310 may provide the consumption data to the data collector 102 (of FIGS. 1 and 2) by RF transmission or other means of communication. The consumption data may be formatted and/or packetized in a manner expected by the data collector. In one example, in a window or period of time following transmission of the consumption data, the radio 302 of the endpoint 104 is capable of receiving data and/or commands. At other times, the radio 302 may be turned off to conserve power.

A firmware block assembly module 312 may be configured to receive an announcement (e.g., a command) regarding an upcoming firmware update. In response to the announcement, the firmware block assembly module 312 may receive blocks of firmware transmitted by a data collector (typically the data collector which reports the endpoint's consumption data to the central office). In one example, all or part of a firmware image is transmitted by the data collector. The transmission may be performed data packet-by-packet and/or data block-by-block. As the packets or blocks are received at the endpoint 104, the firmware block assembly module 312 may assemble them into a firmware image. The firmware image may be complete or incomplete, depending on whether blocks are missing.

A firmware inventory module 314 may be configured to assess the received firmware image and determine if firmware blocks are missing, and if so, which ones. A missing block request module 316 may be configured to request the missing blocks from the data collector and/or to respond to a request from the data collector for the identity of any missing blocks. In one example, the data collector will provide a command requesting the missing block(s) of data during the window when the endpoint has its radio turned on—e.g., in short interval after the endpoint transmits consumption data to the data collector. In other examples, the missing block request module 316 may affirmatively initiate a request for the missing block(s) of data immediately upon completion of the transmission by the data collector, immediately before or after its regularly scheduled transmission of consumption data, or at another time. Other firmware modules 318 may be present in some implementations of the endpoint 104.

Figure 3B:
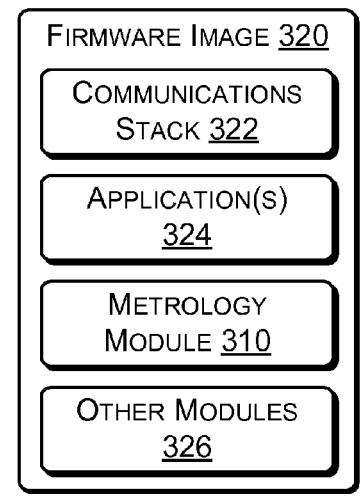
FIG. 3B is a diagram showing an example of a firmware image that may be utilized instead of, or in addition to, elements in the memory of the endpoint of FIG. 3A.

Collectively, the modules 310-318 comprise a first example of a firmware image on the endpoint 104. FIG. 3B is a diagram showing additional and/or alternative aspects of the firmware image seen in FIG. 3A. In particular, the firmware image 320 of FIG. 3B includes a communications stack 322. The communications stack provides the communications functionality to operate the radio 302 and to communicate with the data collector. Application software 324 may include a number of different applications, such as the firmware block assembly module 312, the firmware inventory module 314 and/or the missing block request module 316. Metrology module 310 is similar to the example of FIG. 3A. One or more other applications 326 may also be included in the firmware image. By configuring the firmware image 320 in a modular manner that segregates functional aspects, it is possible to update only a portion of the firmware at a time, rather than all of the firmware. This may considerably reduce network traffic during a firmware update.

Example Methods

The example methods of FIGS. 4-9 may be implemented at least in part by the example configurations of FIGS. 1-3. However, FIGS. 4-9 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof.

In the context of software, the operations represent computer-executable instructions stored on one or more computer-readable storage media (e.g., media 208, 308) that, when executed by one or more processors (e.g., processor 206, 306), perform the recited operations. The computer- and/or processor-readable storage media may be non-transitory and/or "persistent" in design and operation. Such storage media 208, 308, processors 206, 306 and computer-readable instructions can be located within the processing unit or circuitry (e.g., processing unit 204, 304) according to a desired design or implementation. The storage media seen in FIGS. 2 and 3 are representative of storage media generally, both removable and non-removable, and of any technology. Thus, the recited operations represent actions, such as those described in FIGS. 4-9, and may be taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method. The above discussion may apply to other methods described herein.

Additionally, for purposes herein, computer-readable media may include all or part of an application specific integrated circuit (ASIC) or other hardware device. Such a hardware device may be configured to include other functionality, including functions involving firmware update within a wireless network. Accordingly, such an integrated circuit may provide the same functionality as processors and memory configured with executable instructions, and may be defined by logic, transistors or other components.

Figure 4:
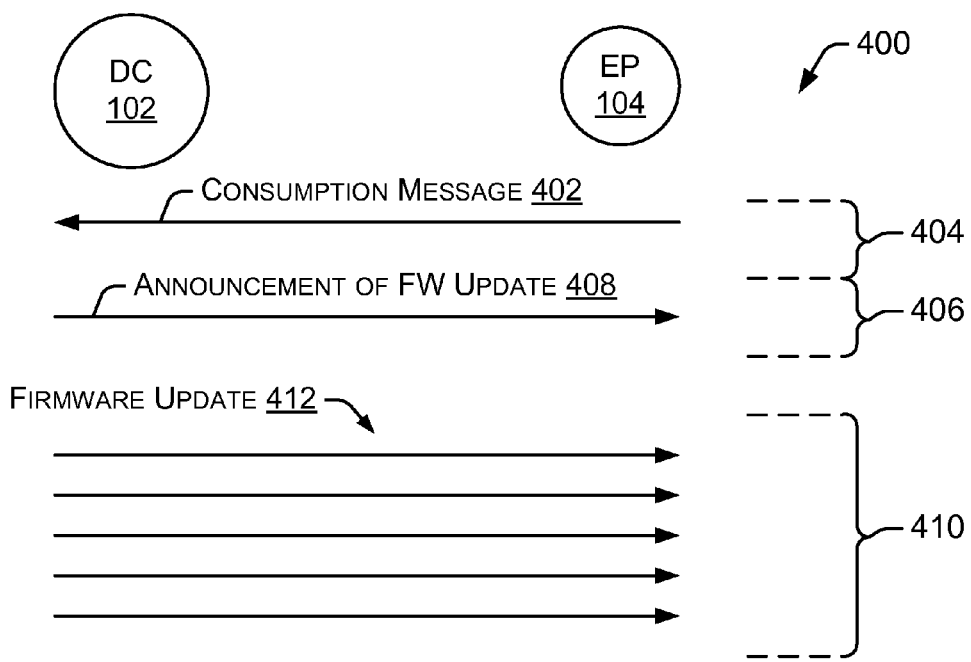
FIG. 4 is a diagram showing an example of event timing, wherein an announcement sets up a broadcast or multicast of a firmware update.

FIG. 4 is a diagram showing an example 400 of event timing, wherein an announcement by a data collector sets up a broadcast or multicast of a firmware update sent to an endpoint. Aspects of the example 400 may be performed by the firmware update module 210 of data collector 102 and the firmware block assembly module 312 of the endpoint 104. In the example 400, an endpoint 104 sends a consumption message 402 (indicating consumption data) to a data collector 102. The consumption message may indicate readings on a consumption meter (e.g., electric meter, water meter, gas meter, etc.) and/or may indicate one or more consumption quantities. The consumption message may be transmitted from the endpoint 104 to the data collector 102 during time period 404. Following time period 404 is a time period 406 during which the radio 302 on the endpoint is turned on (i.e., is configured for reception). Time period 406 may be approximately one second in length, although it may be longer or shorter as needed. During time period 406, the data collector 102 may send the endpoint 104 an announcement 408 of a firmware update scheduled at a time period 410 in the future. At the time period 410 indicated by the announcement, the data collector broadcasts or multicasts the firmware update 412. In the example of FIG. 4, the firmware update is broadcast five separate times, to thereby increase the chance that all blocks and/or packets of the firmware update are received by the endpoint 104 and any other endpoints for which the firmware update is intended.

Figure 5:
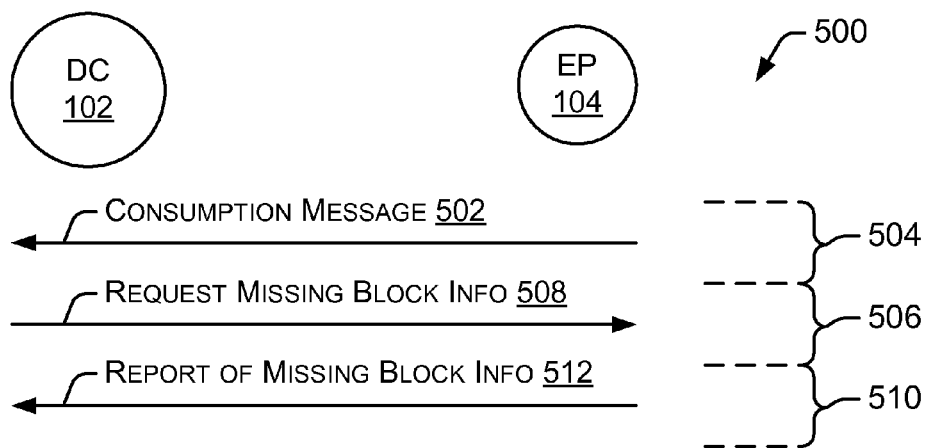
FIG. 5 is a diagram showing an example of event timing, wherein a data collector interrogates an endpoint regarding reception of firmware blocks of a firmware image.

FIG. 5 is a diagram showing an example 500 of event timing, wherein a data collector interrogates an endpoint regarding reception of firmware blocks of a firmware image. Aspects of the example 500 may be performed by the missing blocks checking module 216 of data collector 102 and the firmware inventory module 314 of the endpoint 104. In the example 500, an endpoint 104 sends a consumption message 502 to a data collector 102. The consumption message may be transmitted from the endpoint 104 to the data collector 102 during time period 504. Following time period 504 is a time period 506 during which the radio on the endpoint is turned on. During time period 506, the data collector 102 may send the endpoint 104 a command 508 for the endpoint to announce whether any firmware blocks are missing and/or which firmware blocks are missing from a prior transmission of a firmware update, such as the firmware update described with reference to FIG. 4. During a block of time 510, the endpoint 104 sends a report 512 to the data collector 102 indicating if and/or which blocks of the firmware image were missing.

Figure 6:
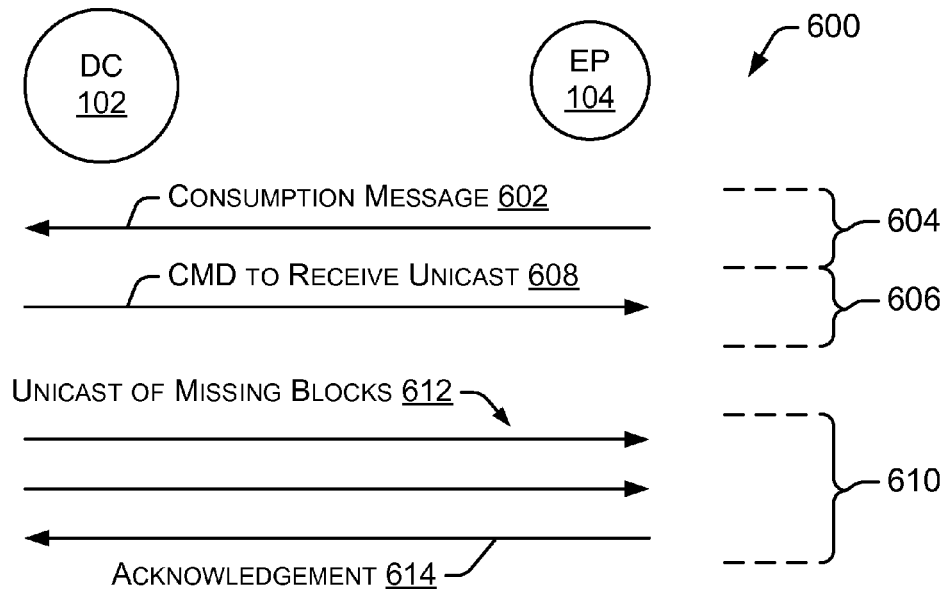
FIG. 6 is a diagram showing an example of event timing, wherein a data collector sets up a unicast event to provide firmware blocks missed by an endpoint.
Figure 7:
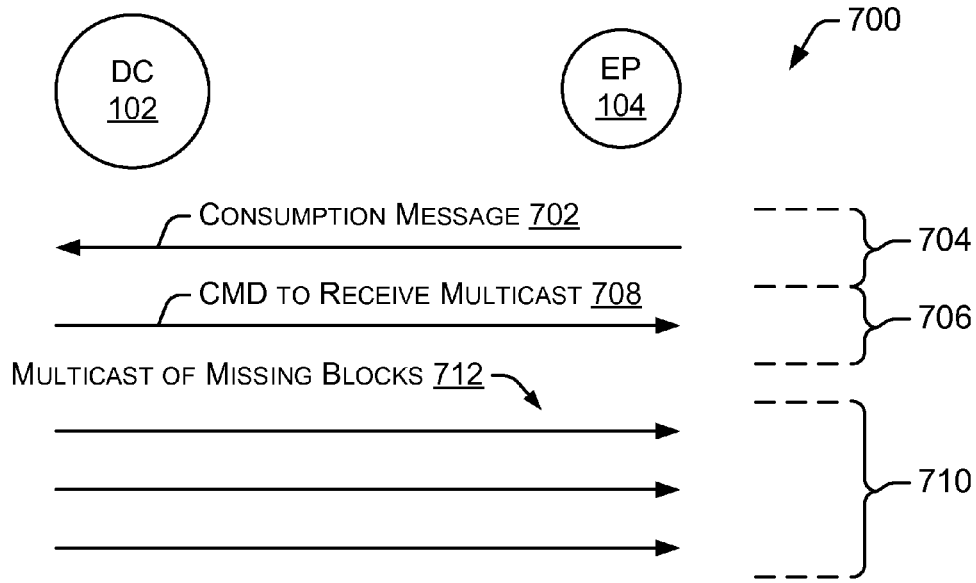
FIG. 7 is a diagram showing an example of event timing, wherein a data collector sets up a broadcast or multicast event to provide firmware blocks missed by one or more endpoints.

FIGS. 6 and 7 show two example alternative methods by which the data collector 102 can transmit the missing firmware blocks to the endpoint 104. The method of FIG. 6 is based on a unicast transmission, while the method of FIG. 7 is based on a multicast and/or broadcast transmission. An algorithm in the firmware update module 210 or other location in the data collector 102 may consider and/or utilize a number of factors to decide between the methods of FIG. 6 and FIG. 7. For example, if only a few endpoints are missing a few firmware blocks, it may be easier, more efficient and/or more economic to unicast the blocks, as indicated by FIG. 6. Alternatively, if many endpoints have missing firmware blocks, it may be more efficient to multicast and/or broadcast the blocks, as indicated by FIG. 7. Thus, the data collector may be configured to decide between unicasting a missed block and multicasting the missed block based on how many endpoints are missing the particular block.

Thus, FIG. 6 is a diagram showing an example 600 of event timing, wherein a data collector 102 sets up a unicast event to provide firmware blocks missed by an endpoint 104. Aspects of example 600 may be performed by the missing blocks replacement module 216 and the missing blocks unicast module 224 of the data collector 102 and the firmware block assembly module 312 of the endpoint 104. In the example 600, an endpoint 104 sends a consumption message 602 to a data collector 102 during time period 604. Following time period 604 is a time period 606 during which the radio on the endpoint 104 is turned on. Within the period 606, a command 608 is sent from the data collector to the endpoint announcing that the firmware blocks missing from the endpoint's firmware image will be unicast during time period 610. During time period 610, the data collector 102 sends the missing blocks 612 to the endpoint 104 using a unicast mode of transmission. The endpoint may send an acknowledgment 614 when the blocks arrive (e.g., arrive without corruption).

FIG. 7 is a diagram showing an example of event timing, wherein a data collector 102 sets up a multicast or broadcast event to provide firmware blocks missed by one or more endpoints 104. Aspects of example 700 may be performed by the missing blocks replacement module 216 and the missing blocks broadcast module 220 and/or the missing blocks multicast module 222 of the data collector 102 and the firmware block assembly module 312 of the endpoint 104. In the example 700, an endpoint 104 sends a consumption message 702 to a data collector 102 during time period 704. Following time period 704 is a time period 706 during which the radio on the endpoint 104 is turned on. During time period 706, a command 708 is sent from the data collector to the endpoint announcing that the firmware blocks missing from the endpoint's firmware image will be broadcast and/or multicast during time period 710. During time period 710, the data collector 102 sends the missing blocks 712 to the endpoint 104 using a broadcast or multicast mode of transmission. The example of FIG. 5 may be repeated, to determine if all endpoints have received all firmware blocks.

Figure 8:
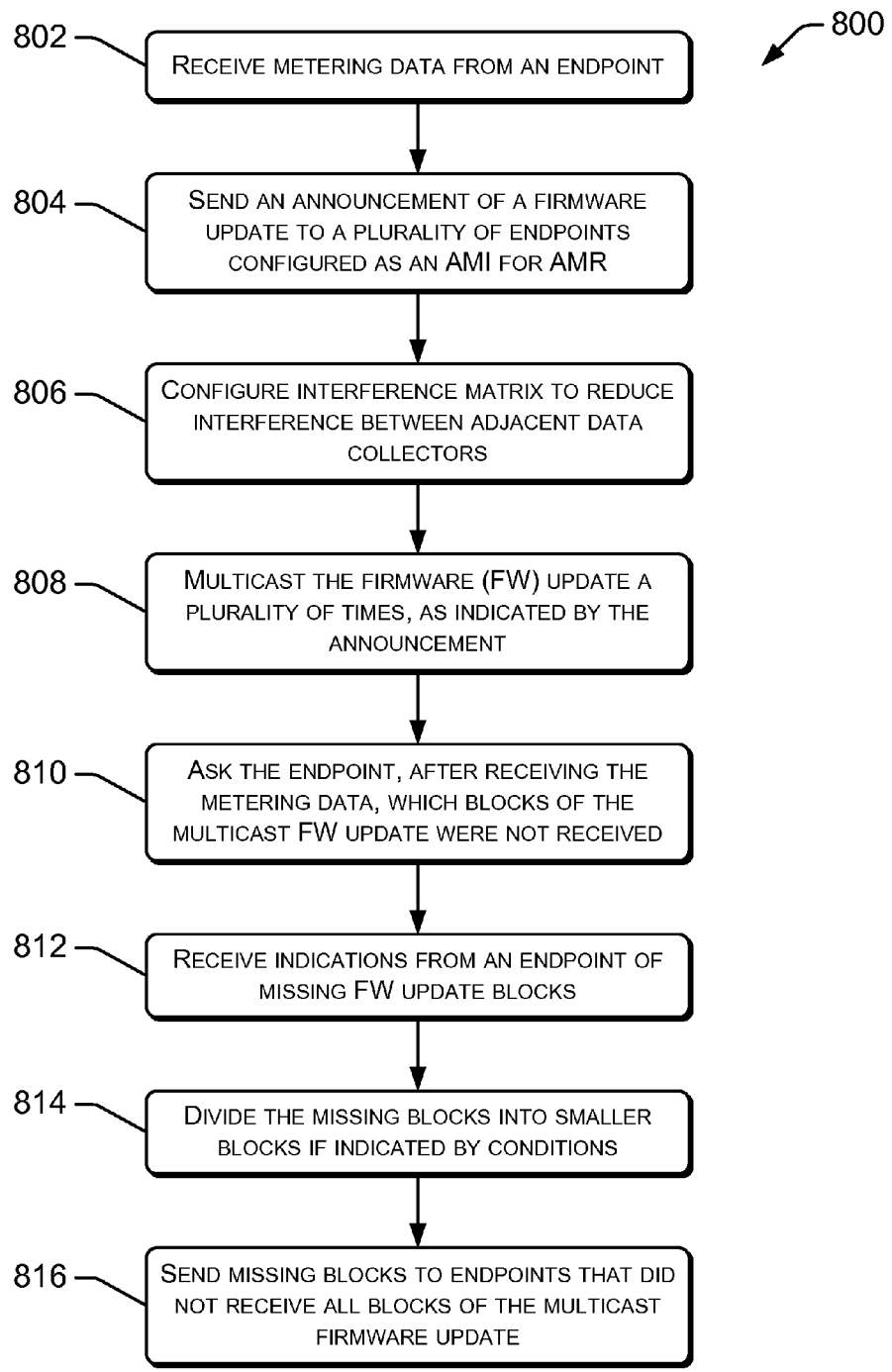
FIG. 8 is a flow diagram illustrating example operation of a data collector, particularly showing its operation to achieve efficient firmware update in a narrow bandwidth system.

FIG. 8 is a flow diagram 800 illustrating example operation of a data collector (e.g., data collector 102 of FIGS. 1 and 2), particularly showing an example of data collector operation to provide efficient firmware update in a narrow bandwidth system. At operation 802, a data collector receives metering data transmitted from an endpoint. The transmission by the endpoint may indicate to the data collector that the endpoint is ready to receive a command. As seen in the context of the examples of FIGS. 4-7, the endpoint 104 transmits metering (consumption) data and then turns on its radio receiver for a period of time.

At operation 804, the data collector sends the endpoint an announcement of a firmware update. The announcement may be made in a unicast mode. In one example, operations 802 and 804 may be repeated, so that a plurality of endpoints is aware of the firmware update. In the context of the example of FIG. 2, the firmware update module 210 may send the announcement of a firmware update to the endpoint.

At operation 806, a plurality of data collectors may be configured according to an interference matrix. In one example, each data collector 102 may be physically located sufficiently distant from other data collectors that simultaneous transmission by adjacent data collectors is well-tolerated by endpoints located between them. In a further example, the interference matrix may alternatively or additionally prevent adjacent data collectors from transmitting at the same time. That is, the data collectors may be segregated to prevent nearby data collectors from transmitting at the same time times, to thereby reduce collisions of packets. Thus, the interference matrix may segregate data collectors physically and/or by time. Transmission of the firmware update may be received by more endpoints if done according to the interference matrix.

At operation 808, the data collector may multicast the firmware update to the endpoint a plurality of times, as indicated by the announcement. In the context of the example of FIG. 2, the broadcast module 212 or the multicast module 214 of the firmware update module 210 of a data collector 102 transmits the firmware update a plurality of times (e.g., five times). This broadcast and/or multicast provides several opportunities for the endpoint(s) to receive a complete firmware image.

At operation 810, the data collector may ask the endpoint, after receiving metering data from the endpoint, for a listing of blocks of the multicast firmware update (firmware image) that were not received by the endpoint. In the context of the example of FIG. 5, the data collector may ask the endpoint after receiving metering data, during a period in which the radio of the endpoint is turned on. And in the context of the example of FIG. 2, the missing blocks checking module 216 of the data collector may ask the endpoint(s) for a listing of which blocks of the firmware image were not received.

At operation 812, the data collector may receive response (s) from the endpoint(s), indicating missing blocks of the firmware update. In the context of the example of FIG. 2, the missing blocks checking module 216 may configure data based on responses from a plurality of endpoints. The data may indicate blocks of the firmware image missed by endpoints in a multicast area of the data collector 102.

At operation 814, in one implementation, the data collector may divide the missing firmware blocks into smaller blocks for transmission. The smaller blocks may be received by the endpoint more reliably.

At operation 816, the data collector may transmit the missing blocks to endpoints that did not receive all of the blocks of the firmware update. In the context of the example of FIG. 2, the transmission may be made by the missing blocks replacement module 218, using broadcast, multicast or unicast modules 220-224. These modules may operate in part according to the timing of events described by FIGS. 6 and 7.

Figure 9:
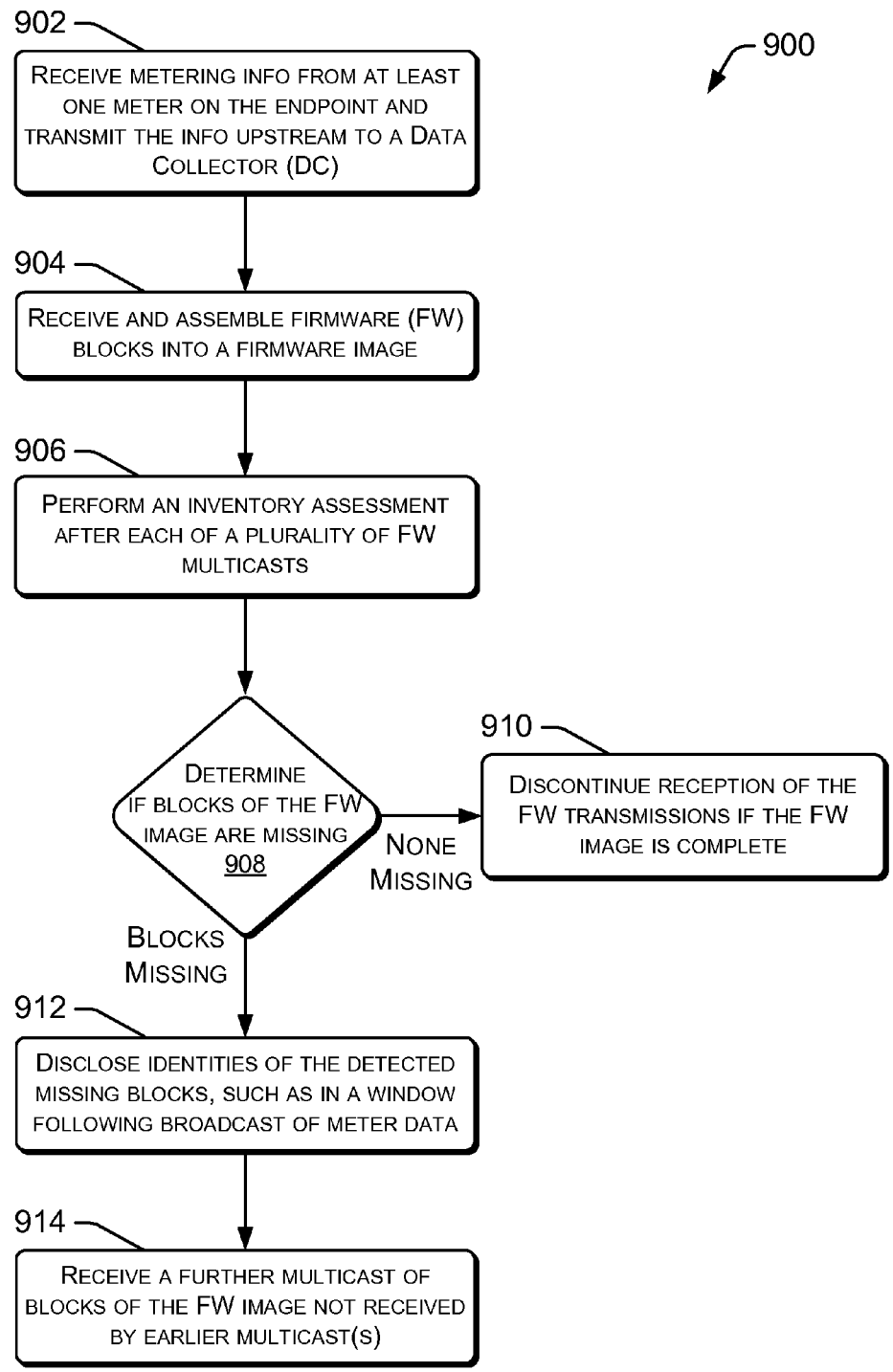
FIG. 9 is a flow diagram illustrating example operation of an endpoint, particularly showing its operation to achieve efficient firmware update in a narrow bandwidth system.

FIG. 9 is a flow diagram illustrating example operation 900 of an endpoint, particularly showing how an endpoint may operate to efficiently download a firmware update in a narrow bandwidth system. At operation 902, the endpoint receives metering information (e.g., consumption data) from one or more meters at the endpoint. This data is transmitted upstream, such as to a data collector. In the context of the example of FIG. 3A, the metrology module 310 receives the metering information and forwards it to a data collector (e.g., data collector 102 of FIG. 1).

At operation 904, the endpoint may receive and assemble firmware blocks into a firmware image. In the context of the example of FIG. 3A, the firmware block assembly module 312 is configured to receive and assemble firmware blocks into a firmware image. The firmware image may resemble firmware image 320 of FIG. 3B.

At operation 906, the endpoint may perform an inventory assessment after each of a plurality of firmware transmissions (e.g., unicast, multicast or broadcast transmissions). The inventory assessment determines if the firmware image is complete, or if one or more firmware blocks is missing and/or corrupted. In the context of the example of FIG. 3A, the firmware inventory module 314 may perform an assessment of the firmware blocks received, and may determine if the firmware image is complete.

At operation 908, the endpoint may determine if firmware blocks are missing. If no blocks of the firmware image are missing—i.e., if the firmware image is complete—then at operation 910 the endpoint may discontinue reception of firmware transmissions from the data collector. This will save battery power for battery powered endpoints. Alternatively, at operation 912, if blocks of the firmware image are missing, the endpoint may disclose the identities of the missing blocks to the data collector. In the context of the example of FIG. 3, the missing block request module 316 may report the missing blocks to the data collector.

At operation 914, the endpoint may receive a further transmission (e.g., unicast, multicast or broadcast transmissions) of the missing blocks. In some circumstances, firmware blocks missing in other endpoints may be included in a multicast or broadcast. In the context of the example of FIG. 3, the firmware block assembly module 312 may receive and assemble the missing blocks.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of updating firmware in a plurality of endpoints configured as an advanced metering infrastructure (AMI) for automated meter reading (AMR), comprising:
    sending an announcement of a firmware update to the plurality of endpoints configured as the AMI for AMR;
    multicasting the firmware update to the plurality of endpoints a plurality of times, as indicated by the announcement, wherein multicasting the firmware update comprises multicasting according to an interference matrix that segregates multicast times of nearby data collectors to reduce collisions of packets;

receiving indications of missing blocks from at least one endpoint of a plurality of endpoints that did not successfully receive all blocks of the multicast firmware update; and sending missing blocks to the at least one endpoint of the plurality of endpoints that did not successfully receive all blocks of the multicast firmware update according to the indications.

2. The method of claim 1, wherein sending the announcement of the firmware update, comprises:

unicasting the announcement to each endpoint during a window following receipt of metering data from the respective endpoint;

wherein the announcement tells the respective endpoint when to receive the firmware update.

3. The method of claim 1, wherein the firmware is configured in a modular manner that segregates functional aspects of the firmware, and wherein the firmware update comprises a modular update including at least one, but not all, of:

a communications stack;
one or more applications; and
metrology-specific functionality.

4. The method of claim 1, wherein sending the missing blocks comprises:

dividing the missing blocks into smaller blocks; and
sending the smaller blocks to the at least one endpoint.

5. The method of claim 1, additionally comprising:

receiving metering data from each endpoint;

asking each endpoint, during a window after receiving the metering data from the respective endpoint and during which the respective endpoint is configured to receive commands, which blocks of the multicast firmware update were not received by the respective endpoint;

receiving, from an endpoint of the plurality of endpoints, an indication of which block(s) of the firmware update were not received by the endpoint; and sending missing blocks indicated by the received indication.

6. The method of claim 1, additionally comprising:

assembling, at the endpoint, blocks of the firmware update received from the multicasting;

determining which blocks of the firmware update are missing; and sending indications of the missing blocks of the firmware update to a data collector.

7. A data collector, comprising:

a radio; and
a processing unit, comprising;
a processor; and
a memory having instructions readable by the processor defining functionality in a plurality of modules, the modules comprising:
a firmware update module, configured to multicast, via the radio, blocks of a firmware image to endpoints within an advanced metering infrastructure (AMI) configured for automated meter reading (AMR), wherein the blocks of the firmware image are multicast at least in part by segregating times at which data is multicast by the data collector and by data collectors near the data collector;
a missing blocks checking module, configured to determine which blocks of the firmware image were not received and which endpoints did not receive them; and a missing blocks replacement module, configured to send, via the radio, the blocks not received to the endpoints which did not receive them.

8. The data collector of claim 7, wherein the firmware update module is additionally configured to:

identify a reception window of an endpoint based on consumption data transmitted by the endpoint, wherein during the reception window the endpoint is able to receive commands; and unicast an announcement to the endpoint during the reception window of an upcoming multicast of a firmware update.

9. The data collector of claim 7, wherein the firmware update module is additionally configured to:

send an announcement of a firmware update to a plurality of endpoints, wherein the announcement is sent to each endpoint during a window after receiving the metering data from the respective endpoint and during which the respective endpoint is configured to receive transmissions, and wherein the announcement instructs the respective endpoint:

that the respective endpoint is to receive the firmware update; and when the respective endpoint is to receive the firmware update; and multicast the firmware update a plurality of times, as indicated by the announcement.

10. The data collector of claim 7, wherein the missing blocks checking module is additionally configured to:

receive metering data from an endpoint;

ask the endpoint, during a window after receiving the metering data and during which the endpoint is configured to receive, if the endpoint received all blocks of the multicast firmware image; and configure data received from asking a plurality of endpoints to determine blocks of the firmware image missed by endpoints in a multicast area of the data collector.

11. The data collector of claim 7, wherein the missing blocks replacement module is additionally configured to:

refer to data indicating blocks of the firmware image missed by endpoints in a multicast area of the data collector; and multicast the indicated blocks missed by the plurality of endpoints in the multicast area of the data collector.

12. The data collector of claim 7, wherein the missing blocks replacement module is additionally configured to:

request data indicating blocks of the firmware image missed by an endpoint; and unicast the indicated blocks requested by the endpoint.

13. The data collector of claim 7, wherein the data collector is configured to decide between unicasting a missed block and multicasting the missed block based on how many endpoints are missing the missed block.

14. The data collector of claim 7, additionally comprising:

a time set module configured to multicast a timestamp to a plurality of endpoints.

15. A system, comprising the data collector of claim 7 and an endpoint, the endpoint comprising:

a metrology module, configured to receive metering information and to transmit it upstream;

a firmware block assembly module, configured to assemble firmware blocks into a firmware image, wherein the firmware blocks were received from the firmware update module of the data collector;

a firmware inventory module, configured to detect missing blocks of the firmware image; and a missing block request module, configured to disclose identities of the detected missing blocks to the missing blocks checking module of the data collector, the disclosing performed in response to a request, the request presented in response to transmission of the metering information upstream.

16. An endpoint, comprising:

a processing unit configured to execute one or more modules;

a metrology module, configured to receive metering information from at least one meter associated with the endpoint and to transmit the metering information upstream within an advanced metering infrastructure (AMI) configured for automated meter reading (AMR);

a firmware block assembly module, configured to receive firmware blocks sent as part of a multicast performed according to an interference matrix that segregates multicast times of data collectors to reduce collisions of packets, and configured to assemble the received firmware blocks into a firmware image;

a firmware inventory module, configured to detect missing blocks of the firmware image; and a missing blocks request module, configured to disclose identities of the detected missing blocks, the disclosure made in response to transmission of the metering information upstream.

17. The endpoint of claim 16, wherein firmware block assembly module is configured to assemble the firmware image from blocks in a two-step process, including:

receiving a first multicast of blocks of a firmware image; and receiving a second transmission of blocks of the firmware image not received by the multicast.

18. The endpoint of claim 16, wherein firmware inventory module is additionally configured to:

perform an inventory assessment after each of a plurality of firmware multicasts; and discontinue reception of the firmware image prior to completion of the plurality of firmware multicasts if the inventory assessment indicates the firmware image is complete.

19. A system, comprising the endpoint of claim 16 and a data collector, the data collector comprising:

a processing unit configured to execute one or more modules;

a firmware update module, configured to multicast blocks of a firmware image to the endpoint;

a missing blocks checking module, configured to determine which blocks were not received by the endpoint based on a report from the missing blocks request module; and a missing blocks replacement module, configured to send the blocks not received to the endpoint.

* * * * *